(12) United States Patent
Xu et al.

(10) Patent No.: US 12,026,450 B2
(45) Date of Patent: Jul. 2, 2024

(54) VISUAL REPRESENTATION FOR HIGHER DIMENSION DATA SETS

(71) Applicant: International Business Machines Corporation, Armonk, NY (US)

(72) Inventors: Chun Lei Xu, Xian (CN); Xiao Bin Sun, Xian (CN); Jia Fei Yang, Xian (CN); Heng Tang, Xian (CN); Xiao Yan XX Liu, Xian (CN); Fan Bai, Xian (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/878,116

(22) Filed: Aug. 1, 2022

(65) Prior Publication Data
US 2024/0037321 A1    Feb. 1, 2024

(51) Int. Cl.
*G06F 16/28*      (2019.01)
*G06F 16/84*      (2019.01)
(Continued)

(52) U.S. Cl.
CPC .......... *G06F 40/137* (2020.01); *G06F 16/287* (2019.01); *G06F 16/84* (2019.01); *G06T 11/206* (2013.01)

(58) Field of Classification Search
CPC ...... G06F 40/137; G06F 16/287; G06F 16/84; G06T 11/206
See application file for complete search history.

(56) References Cited

U.S. PATENT DOCUMENTS

| 7,265,755 B2 | 9/2007 | Peterson |
| 9,508,167 B2 | 11/2016 | Kim et al. |

(Continued)

FOREIGN PATENT DOCUMENTS

| CN | 109271441 A | 9/2020 |
| JP | 6621124 B1 | 12/2019 |

OTHER PUBLICATIONS

Disclosed Anonymously, "Method for Visualizing High Dimensional Data Via Projection to a Spherical Coordinate System," IP.com No. IPCOM000250198D, Published Jun. 9, 2017.
(Continued)

*Primary Examiner* — Sanchita Roy
(74) *Attorney, Agent, or Firm* — Eric W. Chesley

(57) ABSTRACT

A method for adding dimensions to a visual representation is disclosed. In one embodiment, such a method obtains a data set containing data in a plurality of rows and columns (i.e., dimensions). The method divides the dimensions into a plurality of groups and determines a coordinate system for each group. For each row in the data set, the method determines data points for each group in the corresponding coordinate system. The method then connects the data points for each row with lines to create a visual representation for the data set. In certain embodiments, each group in the data set utilizes a two-dimensional coordinate system. In other embodiments, each group in the data set utilizes a three-dimensional coordinate system. In yet other embodiments, a mix of two-dimensional coordinate systems and three-dimensional coordinate systems are used. A corresponding system and computer program product are also disclosed.

20 Claims, 9 Drawing Sheets

(51) Int. Cl.
*G06F 40/137* (2020.01)
*G06T 11/20* (2006.01)

(56) References Cited

U.S. PATENT DOCUMENTS

| | | | |
|---|---|---|---|
| 2011/0131250 A1* | 6/2011 | Stolte | G06F 40/177 |
| | | | 707/802 |
| 2013/0097563 A1* | 4/2013 | Pacheco Rodrigues Velho | G06F 3/0488 |
| | | | 715/850 |
| 2020/0050351 A1* | 2/2020 | Slawinski | G06F 16/904 |

OTHER PUBLICATIONS

Lu, Liangfu, et al. "Double-Arc Parallel Coordinates and its Axes Re-ordering Methods," Mobile Networks and Applications, Published Jan. 2020.

Ren, Pin, et al., "Dimensional Compositing for Visualizing High-Dimensional Dataset," Siggraph '06: ACM SIGGRAPH 2006 Research posters, Published Jul. 30, 2006.

Sharma, Himanshu, "Visualizing High Dimensional Data," PRNewswire, Published Jun. 5, 2021.

* cited by examiner

300

| Group 1 | | | Group 2 | | | Group 3 | | |
| Point 1 | | | Point 2 | | | Point 3 | | |
| age | employ | income | debtinc | creddebt | othdebt | preddef1 | preddef2 | preddef3 |
| 0.583 | 0.515 | 0.376 | 0.223 | 0.552 | 0.141 | 0.809 | 0.790 | 0.158 |
| 0.194 | 0.303 | 0.042 | 0.417 | 0.066 | 0.113 | 0.198 | 0.128 | 0.415 |
| 0.556 | 0.455 | 0.097 | 0.131 | 0.041 | 0.060 | 0.010 | 0.003 | 0.076 |
| 0.583 | 0.455 | 0.247 | 0.068 | 0.128 | 0.022 | 0.021 | 0.018 | 0.033 |
| 0.111 | 0.061 | 0.035 | 0.417 | 0.086 | 0.086 | 0.783 | 0.739 | 0.415 |
| 0.583 | 0.152 | 0.028 | 0.245 | 0.019 | 0.060 | 0.217 | 0.328 | 0.182 |
| 0.528 | 0.606 | 0.125 | 0.740 | 0.186 | 0.473 | 0.186 | 0.179 | 0.850 |
| 0.639 | 0.364 | 0.058 | 0.085 | 0.006 | 0.034 | 0.015 | 0.011 | 0.044 |
| 0.111 | 0.091 | 0.014 | 0.590 | 0.066 | 0.092 | 0.749 | 0.620 | 0.675 |
| 0.444 | 0.000 | 0.028 | 0.476 | 0.135 | 0.060 | 0.816 | 0.798 | 0.505 |
| 0.194 | 0.000 | 0.007 | 0.039 | 0.008 | 0.001 | 0.350 | 0.612 | 0.018 |
| 0.139 | 0.121 | 0.023 | 0.124 | 0.012 | 0.026 | 0.239 | 0.219 | 0.070 |

Fig. 3

VISUAL REPRESENTATION FOR HIGHER DIMENSION DATA SETS

BACKGROUND

Field of the Invention

This invention relates to systems and methods for adding dimensions to a visual representation.

Background of the Invention

In order to understand and reduce the complexity of data, various types of visual representations may be used to present data. For example, charts or graphs may be used to visually represent data of a data set and assist viewers in understanding characteristics of the data, such as outliers, similarities, or trends within the data. Charts and graphs may also assist in presenting data to others and making a presentation more interesting and captivating to an audience.

Visually representing a data set is limited by current visualization techniques, such as scatter plots, line graphs, bar charts, pie charts, and the like. Most often, these visualization techniques present data in two dimensions. In other cases, three-dimensional (3-D) scatter plots, bar charts, or the like may be used to present data in three dimensions. For data having more than three dimensions, options are limited as to how to represent data. In some cases, different legends, object sizes, colors, or the like may be used to flag data points and thereby show additional dimensions.

Another technique is to reduce a number of dimensions of a data set before representing it using a visualization technique. For example, dimension reduction algorithms such as PCA, ISOMap, and tSNE may be used to reduce a number of dimensions of a data set before it is visually represented. Using such techniques, a data set may be reduced to a two-dimensional or three-dimensional data set to prepare the data for use with one of the visualization technologies described above. However, these dimension reduction algorithms may cause various details or characteristics of the data to be lost. Thus, techniques are needed to visually represent data with a higher number of dimensions without having to utilize data reduction algorithms or other similar techniques.

SUMMARY

The invention has been developed in response to the present state of the art and, in particular, in response to the problems and needs in the art that have not yet been fully solved by currently available systems and methods. Accordingly, systems and methods have been developed for adding dimensions to a visual representation. The features and advantages of the invention will become more fully apparent from the following description and appended claims, or may be learned by practice of the invention as set forth hereinafter.

Consistent with the foregoing, a method for adding dimensions to a visual representation is disclosed. In one embodiment, such a method obtains a data set containing data in a plurality of rows and columns (i.e., dimensions). The method divides the dimensions into a plurality of groups and determines a coordinate system for each group. For each row in the data set, the method determines data points for each group in the corresponding coordinate system. The method then connects the data points for each row with lines to create a visual representation for the data set. In certain embodiments, each group in the data set utilizes a two-dimensional coordinate system. In other embodiments, each group in the data set utilizes a three-dimensional coordinate system. In yet other embodiments, a mix of two-dimensional coordinate systems and three-dimensional coordinate systems are used. Once the visual representation is created, the method may enable rotation of the visual representation to allow viewing from different angles.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which:

FIG. 3 is a high-level block diagram showing a data set, made up of rows and dimension, divided into multiple groups;

DETAILED DESCRIPTION

Figure 1:
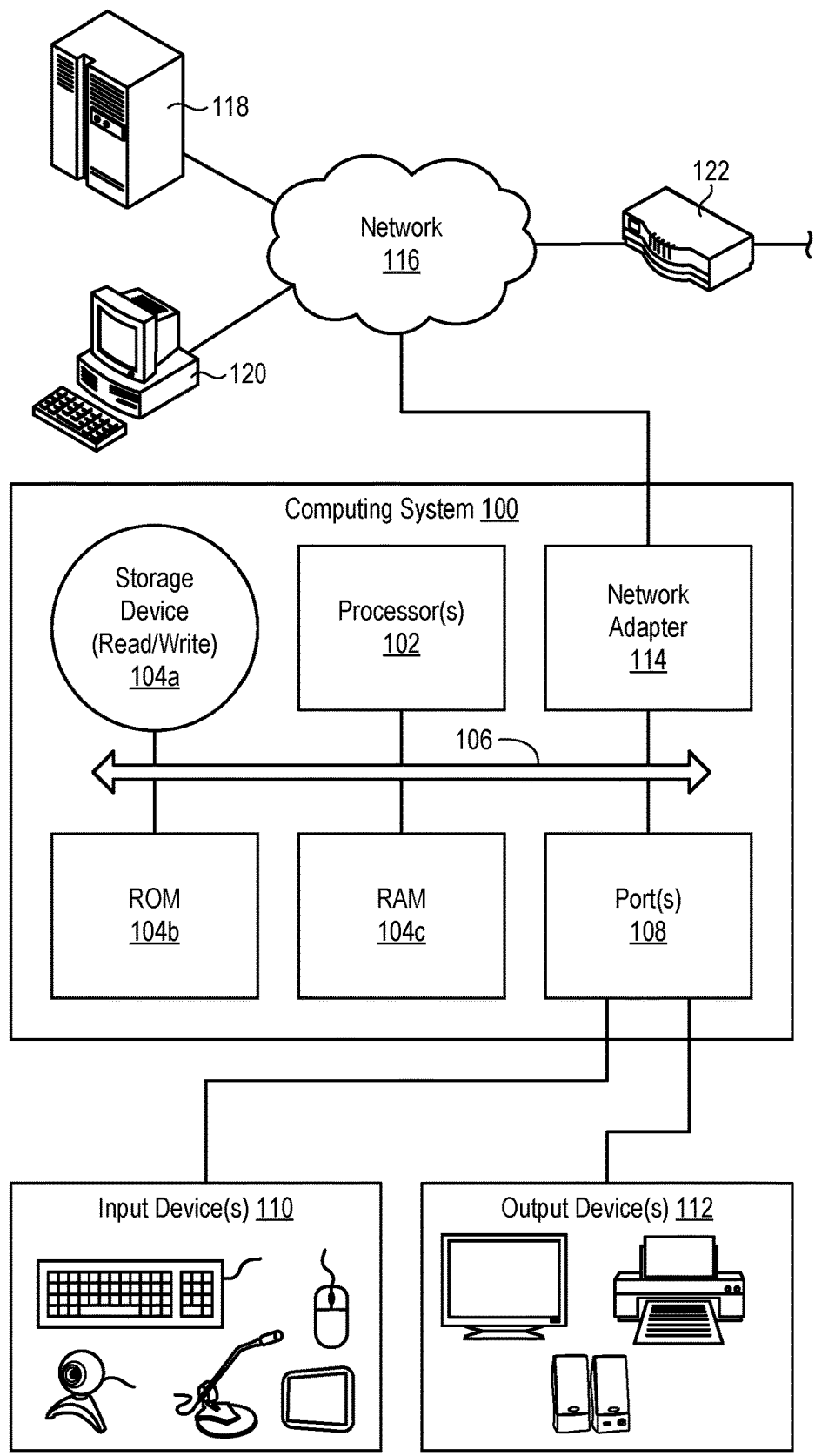
FIG. 1 is a high-level block diagram showing one example of a computing system for use in implementing embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a computing system 100 is illustrated. The computing system 100 is presented to show one example of an environment where systems and methods in accordance with the invention may be implemented. The computing system 100 may be embodied as a desktop computer, a workstation, a laptop computer, a server, a storage controller, a mobile device 100 such as a smart phone or tablet, or the like. The computing system 100 is presented by way of example and is not intended to be limiting. Indeed, the systems and methods disclosed herein may be applicable to a wide variety of different computing systems in addition to the computing system 100 shown. The systems and methods disclosed herein may also potentially be distributed across multiple computing systems 100.

As shown, the computing system 100 includes at least one processor 102 and may include more than one processor 102. The processor 102 may be operably connected to a memory 104. The memory 104 may include one or more non-volatile storage devices such as hard drives 104a, solid state drives 104a, CD-ROM drives 104a, DVD-ROM drives 104a, tape drives 104a, or the like. The memory 104 may also include non-volatile memory such as a read-only memory 104b (e.g., ROM, EPROM, EEPROM, and/or Flash ROM) or volatile memory such as a random access memory 104c (RAM or operational memory). A bus 106, or plurality of buses 106, may interconnect the processor 102, memory devices 104, and other devices to enable data and/or instructions to pass therebetween.

To enable communication with external systems or devices, the computing system 100 may include one or more ports 108. Such ports 108 may be embodied as wired ports 108 (e.g., USB ports, serial ports, Firewire ports, SCSI ports, parallel ports, etc.) or wireless ports 108 (e.g., Bluetooth, IrDA, etc.). The ports 108 may enable communication with one or more input devices 110 (e.g., keyboards, mice, touchscreens, cameras, microphones, scanners, storage devices, etc.) and output devices 112 (e.g., displays, monitors, speakers, printers, storage devices, etc.). The ports 108 may also enable communication with other computing systems 100.

In certain embodiments, the computing system 100 includes a wired or wireless network adapter 114 to connect the computing system 100 to a network 116, such as a local area network (LAN), wide area network (WAN), storage area network (SAN), or the Internet. Such a network 116 may enable the computing system 100 to connect to or communicate with one or more servers 118, workstations 120, personal computers 120, mobile computing devices, or other devices. The network 116 may also enable the computing system 100 to connect to or communicate with another network by way of a router 122 or other device 122. Such a router 122 may allow the computing system 100 to communicate with servers, workstations, personal computers, or other devices located on different networks.

Figure 2:
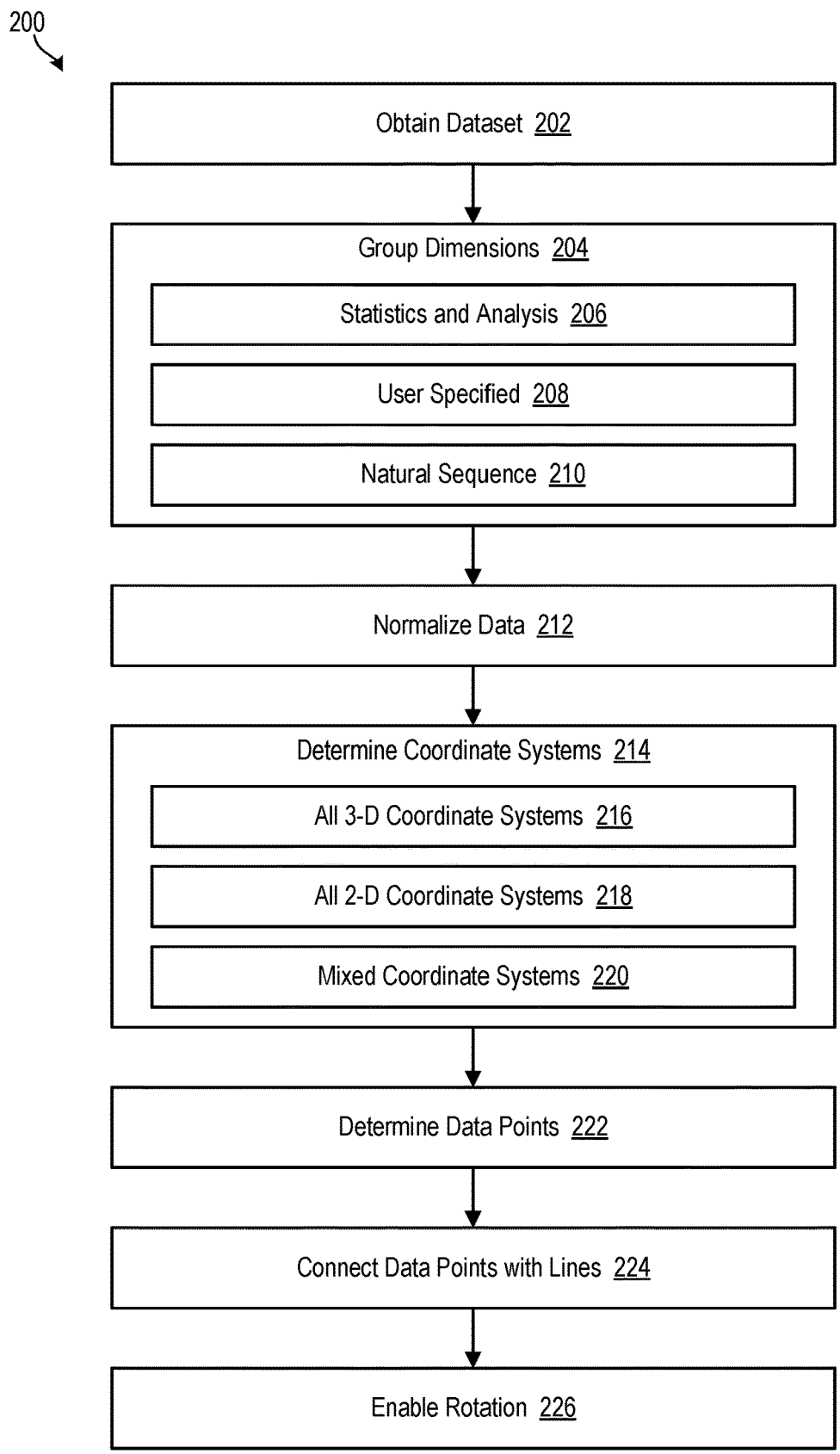
FIG. 2 is a high-level block diagram showing one embodiment of a method in accordance with the invention.

Referring to FIG. 2, as previously mentioned, visually representing a data set is limited by current visualization techniques, such as scatter plots, line graphs, bar charts, pie charts, and the like. Most often, these visualization techniques present data in two dimensions. In other cases, three-dimensional scatter plots, bar charts, or the like may be used to present data in three dimensions. For data having more than three dimensions, options are limited as to how to represent data. In some cases, different legends, object sizes, colors, or the like may be used to flag data points and thereby show additional dimensions.

Referring to FIG. 2, in view of the foregoing, it would be an advance in the art to develop visual representation techniques that can clearly represent data having more than two or three dimensions, possibly many more dimensions. One such technique for visually representing data is shown in FIG. 2.

FIG. 2 shows one embodiment of a method 200 for adding dimensions to a visual representation. This may be accomplished without using any dimensional reduction algorithms such as PCA, ISOMap, or tSNE. As shown, the method 200 initially obtains 202 a data set. In certain embodiments, this data set is made up of a plurality of rows and columns. In certain embodiments, each row is a record in the data set. Each column may correspond to a dimension of the data set. For example, a data set with nine columns may be deemed to have nine dimensions.

Once a data set has been obtained 202, the method 200 may group 204 columns (e.g., dimensions) of the data set. For example, these groupings may be made in one, two, or three dimensions, or in other words, one, two, or three columns of the data set may be grouped together. In one embodiment, statistics and analysis 206 may be used to determine the groupings. For example, in certain embodiments, the Pearson Correlation Coefficient (PCC) may be used to determine correlations between the dimensions of a data set. The groupings of the columns may be based on these correlations.

In other embodiments, the groupings of the dimensions are user specified 208. In yet other embodiments, the groupings of the dimensions are based on a natural sequence 210, such as the order the dimensions appear in the data set. For example, the first three dimensions may be grouped, the next three dimensions may be grouped, and the next three dimensions may be grouped in the order they exist in the data set.

In certain embodiments, the data in the data set is normalized 212. For example, for each dimension or column in the data set, the data in the dimension or column may be normalized and mapped to a value between zero and one.

The method 200 may then determine 214 a coordinate system for each group in the data set. For example, if a group contains three columns, a three-dimensional coordinate system may be selected for the group. If a group contain two columns, a two-dimensional coordinate system may be selected for the group. In certain embodiments, determining 214 the coordinate systems includes selecting 216 three-dimensional coordinate systems for all groups in the data set. In other embodiments, determining 214 the coordinate systems includes selecting 218 two-dimensional coordinate systems for all groups in the data set. In yet other embodiments, determining 214 the coordinate systems includes selecting 220 a mix of two-dimensional coordinate systems and three-dimensional coordinate systems for groups in the data set.

The method 200 may then determine 222 data points for each group of each row in the data set. For example, for a selected row, columns in a first group may be used to determine a first data point. Columns in a second group may be used to determine a second data point, and columns in a third group may be used to determine a third data point.

Once the data points are determined 222 for each row in the data set, the method 200 may connect 224 the data points of each row with a line to generate the visual representation. Once the visual representation is created, the method 200 may enable 226 the visual representation to be rotated to enable viewing from different angles. This may enable a user to visualize the characteristics of a data set with many more dimensions than two or three, and enable the user to see outliers, similarities, or trends within the data.

Referring to FIG. 3, one embodiment of a data set 300 with a large number of dimensions is illustrated. As shown, the data set 300 includes nine columns (i.e., dimensions). The data in the data set has been normalized to a value between zero and one. In the illustrated embodiment, the dimensions are divided into three groups. Each group may be associated with a different three-dimensional coordinate system. In the illustrated embodiment, the first row of the data set 300 includes three data points (i.e., Point 1, Point 2, and Point 3) that may be plotted in three three-dimensional coordinate systems of the visual representation.

Figure 4:
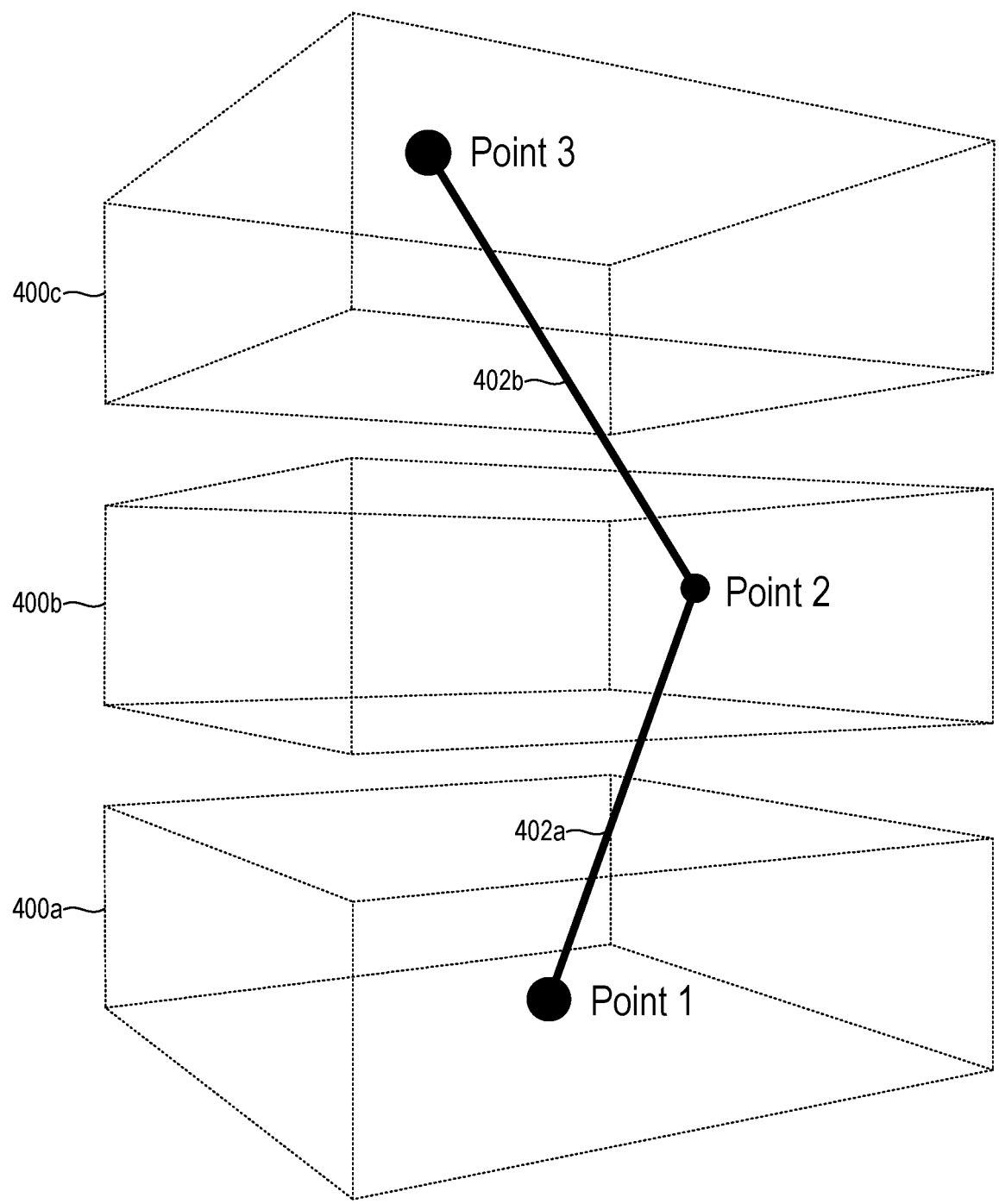
FIG. 4 is a perspective view showing data points in different three-dimensional coordinate systems connected by lines.

For example, FIG. 4 shows one example of a visual representation made up of three three-dimensional coordinate systems 400a-c. As shown, each three-dimensional coordinate system 400 is represented as a cube or cuboid to reflect x, y, and z directions. Each three-dimensional coordinate system 400a-c in the visual representation is separated by a visual gap to enable lines to be drawn between data points. The data point "Point 1" is plotted in the first three-dimensional coordinate system 400a, the data point "Point 2" is plotted in the second three-dimensional coordinate system 400b, and the data point "Point 3" is plotted in the third three-dimensional coordinate system 400c. As further shown in FIG. 3, once the data points are plotted, the data points may be connected with the line segments 402a, 402b. In essence, the visual representation of FIG. 4 is able to display nine dimensions of a data set 300 without using any dimensional reduction algorithm. This is a significant improvement compared to conventional visual representation techniques.

Figure 5:
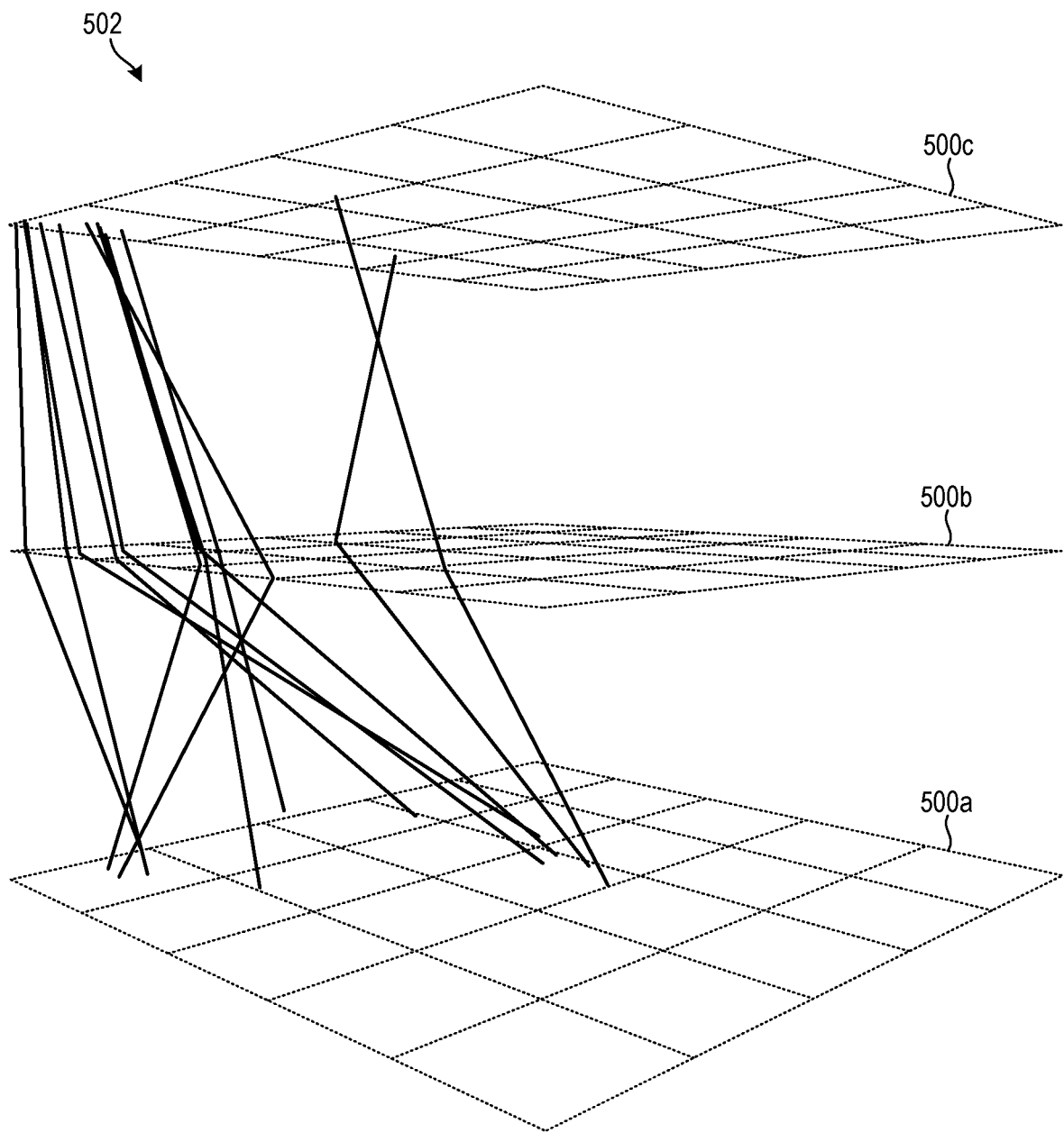
FIG. 5 shows one embodiment of a visual representation utilizing all two-dimensional coordinate systems.

FIG. 5 shows one embodiment of a visual representation 502 in accordance with the invention that utilizes three two-dimensional coordinate systems 500a-c to visually represent a data set 300. As shown, each two-dimensional coordinate system 500*a*-*c* may be represented as a plane. In this embodiment, the visual representation 502 is able to visually present a data set 300 where each row or record has six dimensions and three data points. Like the previous example, each two-dimensional coordinate system 500 in the visual representation 502 is separated by a visual gap. Each line in the visual representation 502 connects data points associated with each row in the data set 300, thereby enabling the characteristics of the rows to be visually compared to one another.

Figure 6:
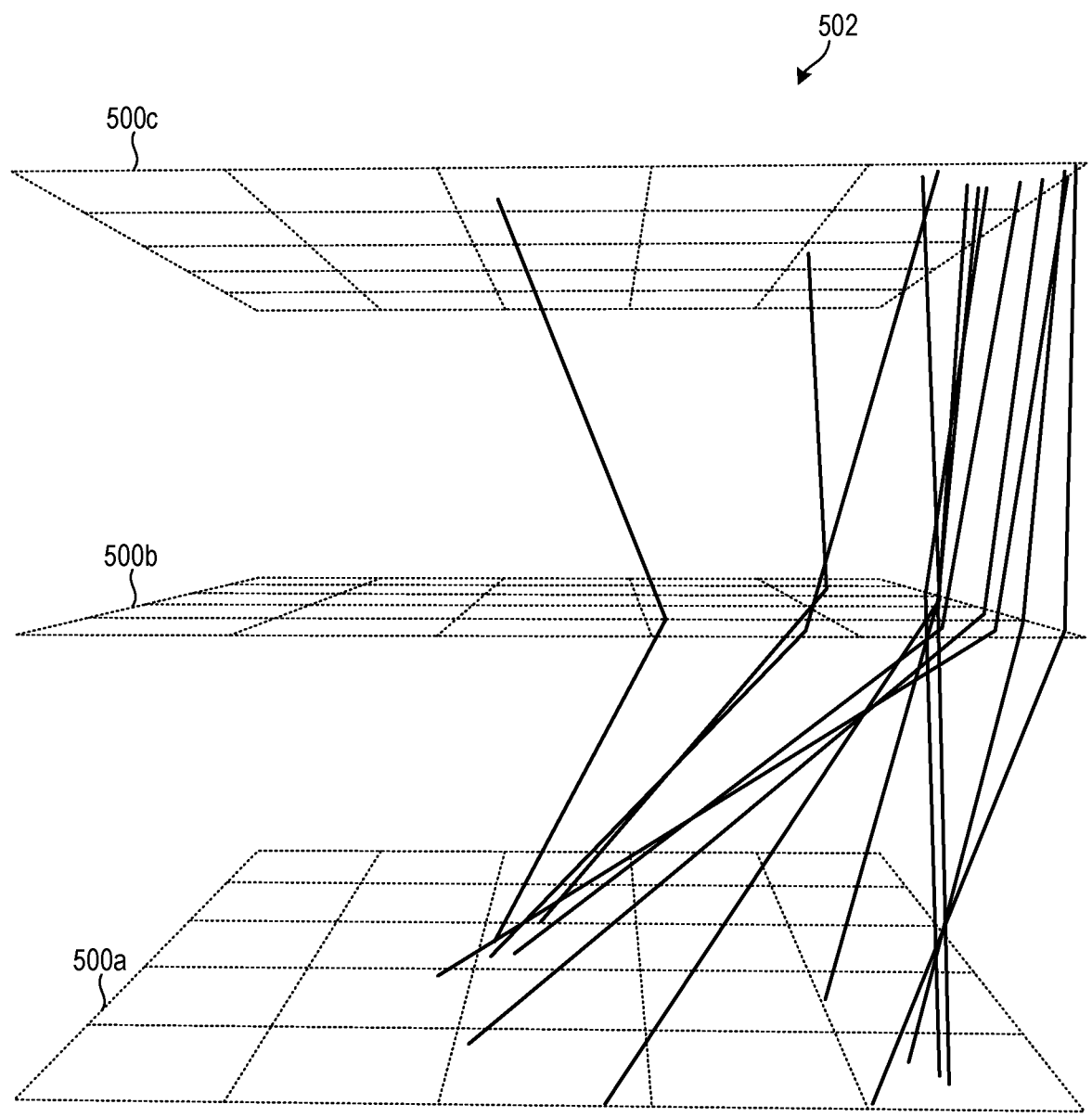
FIG. 6 shows the visual representation of FIG. 5 rotated to a different viewing angle.

In certain embodiments, once a visual representation 502 is created and displayed on a user's screen, the visual representation 502 may be rotated by the user to provide different views of the visual representation 502 and the lines contained therein. This may provide the user with additional insight or understanding of the characteristics of the data set 300, as well as enable the user to compare the characteristics of each line (i.e., row) of the data set 300. In certain embodiments, each line may be displayed in a different color, line type, etc., to assist a user in differentiating the lines (associated rows or records) from each other within the visual representation 502. FIG. 6 shows the visual representation 502 of FIG. 5 rotated to a different viewing angle. In certain embodiments, the visual representation 502 may be rotated around an x, y, or z axis, or a combination thereof.

Figure 7:
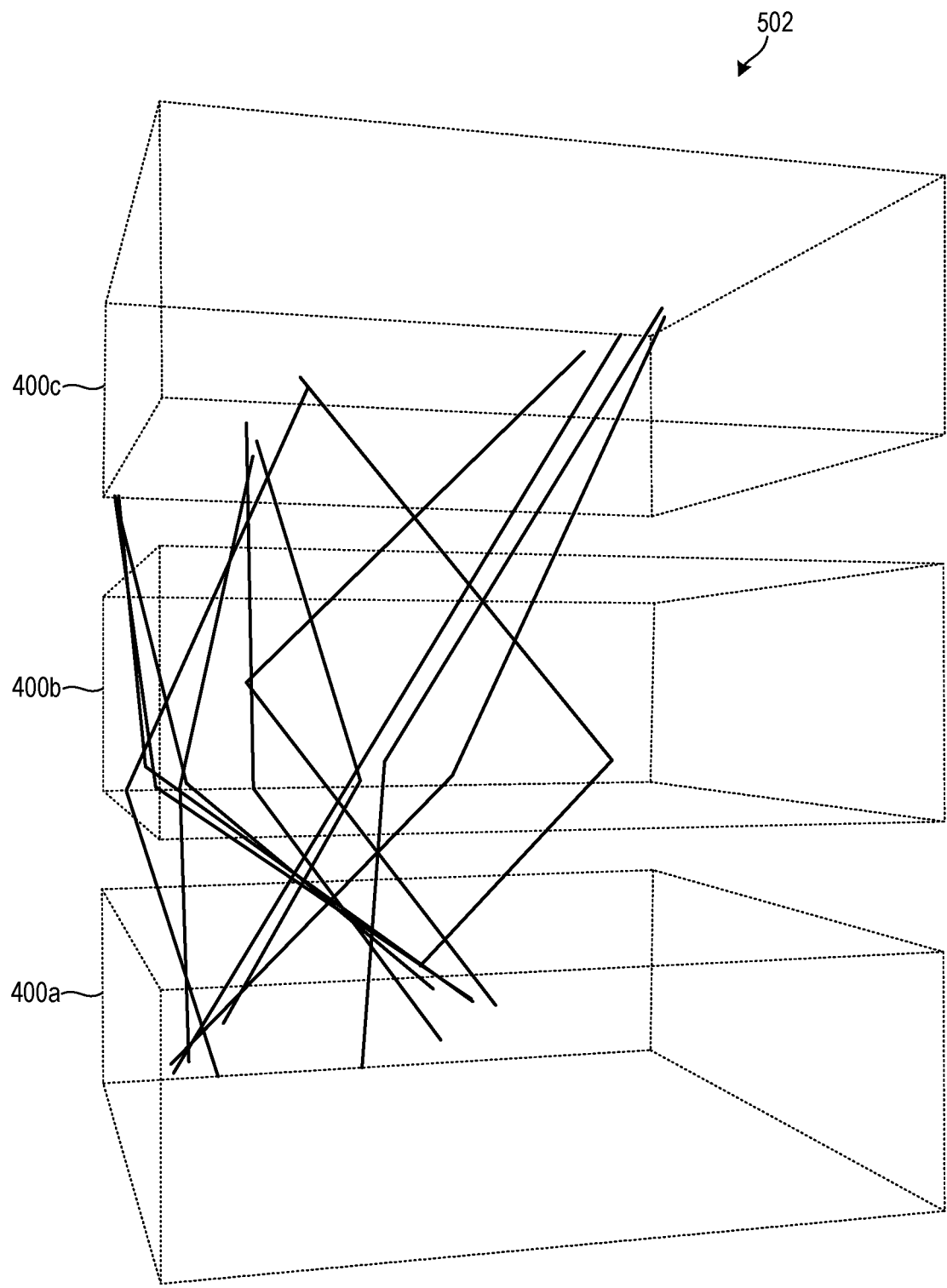
FIG. 7 shows one embodiment of a visual representation utilizing all three-dimensional coordinate systems.

FIG. 7 shows one embodiment of a visual representation 502 in accordance with the invention that utilizes three three-dimensional coordinate systems 400*a*-*c* to visually represent a data set 300. In this embodiment, the visual representation 502 visually presents a data set 300 with nine dimensions and three data points per row. As shown, each three-dimensional coordinate system 400 in the visual representation 502 is separated by a visual gap. Each line in the visual representation 502 connects data points associated with a particular row in the data set 300 to enable characteristics of the rows to be visually compared to one another.

Figure 8:
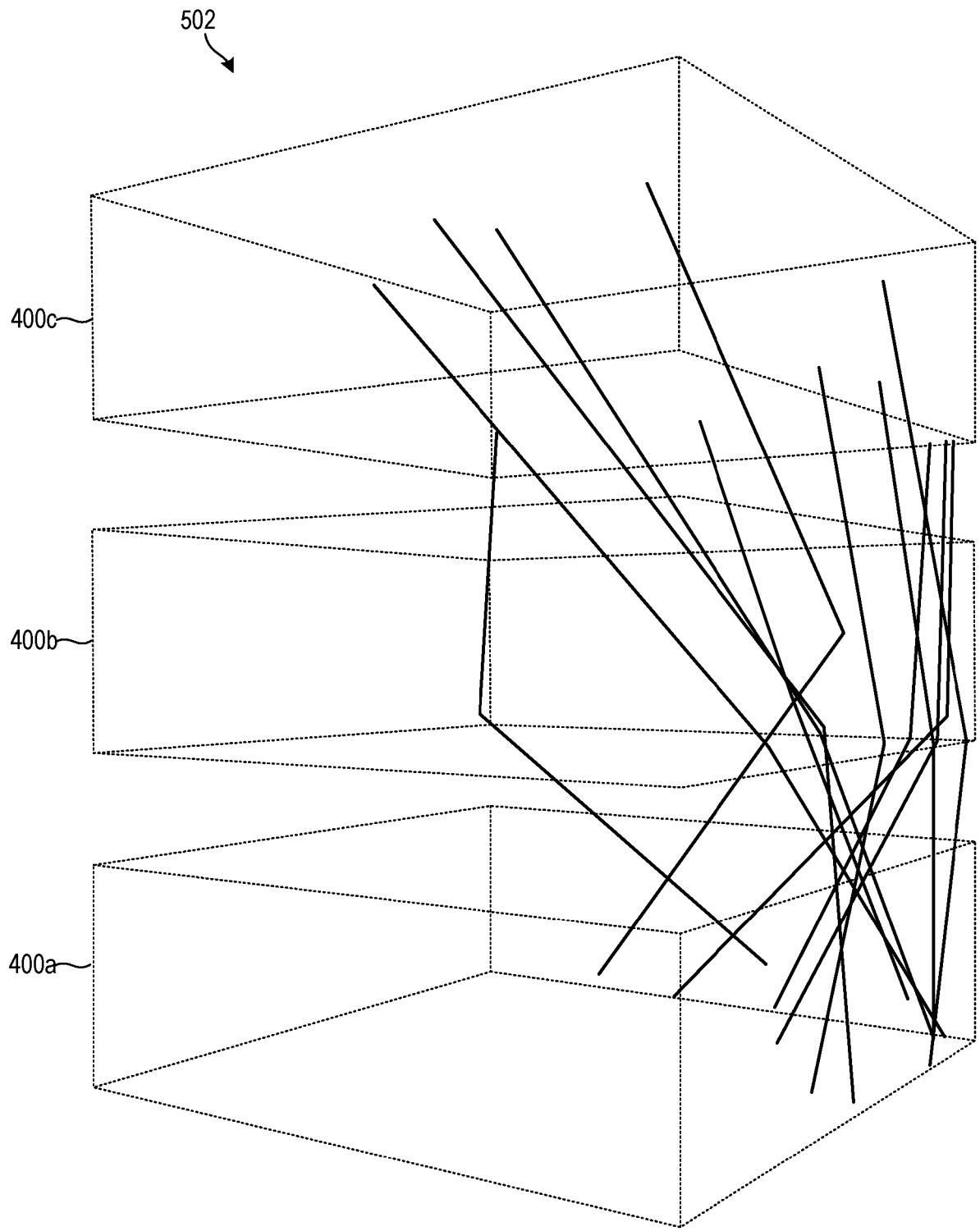
FIG. 8 shows the visual representation of FIG. 7 rotated to a different viewing angle.

Like the previous example, once a visual representation 502 is created and displayed on a user's screen, the visual representation 502 may be rotated to enable different views of the visual representation 502 and the lines contained therein. This may provide the user with additional insight or understanding of the characteristics of the data set 300 and enable the user to compare the characteristics of each line (i.e., row) of the data set 300. FIG. 8 shows the visual representation 502 of FIG. 7 rotated to a different viewing angle.

Figure 9:
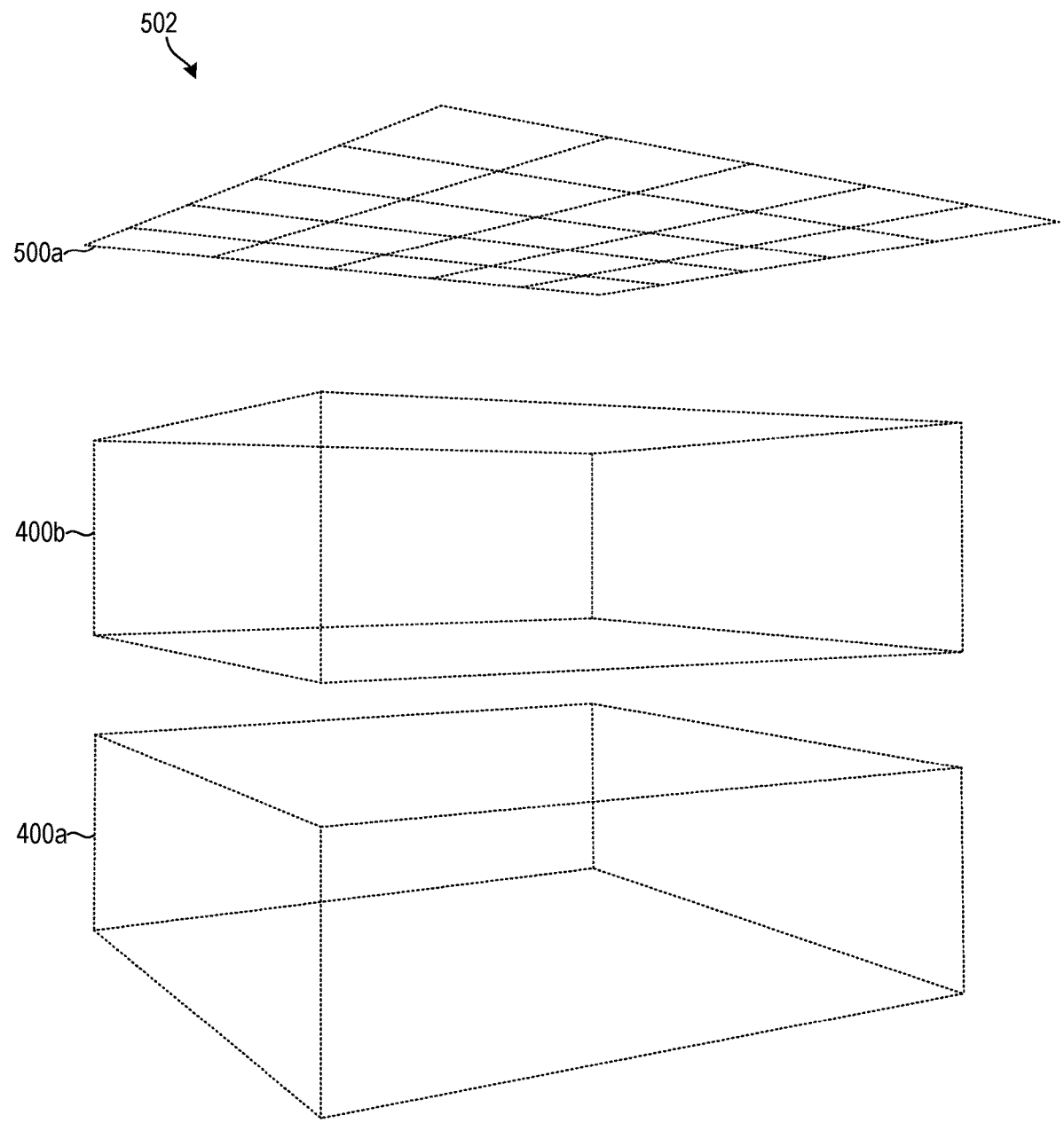
FIG. 9 shows a visual representation utilizing a mix of two-dimensional coordinate systems and three-dimensional coordinate systems.

Referring to FIG. 9, as previously mentioned, in certain embodiments a visual representation may utilize a mix of two-dimensional coordinate systems 500 and three-dimensional coordinate systems 400 for groups in a data set 300. One example of such a visual representation is shown in FIG. 9. In addition, a visual representation in accordance with the invention is not limited to three coordinate systems, but may include any number of coordinate systems to visually represent data sets 300 with different numbers of dimensions.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for adding dimensions to a visual representation, the method comprising:
   obtaining a data set comprising data in a plurality of rows divided into a plurality of dimensions;
   dividing the plurality of dimensions into a plurality of groups, wherein a number of dimensions in a first group of the plurality of groups is different from a number of dimensions in a second group of the plurality of groups;
   determining a coordinate system for each group in the plurality of groups based on a number of dimensions in the group, wherein a dimensionality of a first coordinate system assigned to the first group is different from a dimensionality of a second coordinate system assigned to the second group;
   for each row in the data set, determining data points for each group for plotting in a corresponding coordinate system;
   connecting the data points for each row with lines to create a visual representation for the data set, such that a line extends between a first data point in the first coordinate system and a second data point in the second coordinate system; and
   outputting the visual representation for display on a display device.

2. The method of claim 1, further comprising normalizing the data in the data set.

3. The method of claim 1, wherein determining the coordinate system comprises utilizing a two-dimensional coordinate system for at least one group in the data set.

4. The method of claim 1, wherein determining the coordinate system comprises utilizing a three-dimensional coordinate system for at least one group in the data set.

5. The method of claim 1, wherein determining the coordinate system comprises utilizing at least one two-dimensional coordinate system and at least one three-dimensional coordinate system for groups in the data set.

6. The method of claim 1, further comprising enabling rotation of the visual representation to enable viewing from different angles.

7. The method of claim 1, further comprising providing a visual gap between the first and second coordinate systems in the visual representation.

8. A computer program product for adding dimensions to a visual representation, the computer program product comprising a computer-readable storage medium having computer-usable program code embodied therein, the computer-usable program code configured to perform the following when executed by at least one processor:
   obtain a data set comprising data in a plurality of rows divided into a plurality of dimensions;
   divide the plurality of dimensions into a plurality of groups, wherein a number of dimensions in a first group of the plurality of groups is different from a number of dimensions in a second group of the plurality of groups;

determine a coordinate system for each group in the plurality of groups based on a number of dimensions in the group, wherein a dimensionality of a first coordinate system assigned to the first group is different from a dimensionality of a second coordinate system assigned to the second group;

for each row in the data set, determine data points for each group for plotting in a corresponding coordinate system;

connect the data points for each row with lines to create a visual representation for the data set, such that a line extends between a first data point in the first coordinate system and a second data point in the second coordinate system; and outputting the visual representation for display on a display device.

9. The computer program product of claim 8, wherein the computer-usable program code is further configured to normalize the data in the data set.

10. The computer program product of claim 8, wherein determining the coordinate system comprises utilizing a two-dimensional coordinate system for at least one group in the data set.

11. The computer program product of claim 8, wherein determining the coordinate system comprises utilizing a three-dimensional coordinate system for at least one group in the data set.

12. The computer program product of claim 8, wherein determining the coordinate system comprises utilizing at least one two-dimensional coordinate system and at least one three-dimensional coordinate system for groups in the data set.

13. The computer program product of claim 8, wherein the computer-usable program code is further configured to enable rotation of the visual representation to enable viewing from different angles.

14. The computer program product of claim 8, wherein the computer-usable program code is further configured to provide a visual gap between the first and second coordinate systems in the visual representation.

15. A system for adding dimensions to a visual representation, the system comprising:

at least one processor;

at least one memory device operably coupled to the at least one processor and storing instructions for execution on the at least one processor, the instructions causing the at least one processor to:

obtain a data set comprising data in a plurality of rows divided into a plurality of dimensions;

divide the plurality of dimensions into a plurality of groups, wherein a number of dimensions in a first group of the plurality of groups is different from a number of dimensions in a second group of the plurality of groups;

determine a coordinate system for each group in the plurality of groups based on a number of dimensions in the group, wherein a dimensionality of a first coordinate system assigned to the first group is different from a dimensionality of a second coordinate system assigned to the second group;

for each row in the data set, determine data points for each group for plotting in a corresponding coordinate system;

connect the data points for each row with lines to create a visual representation for the data set, such that a line extends between a first data point in the first coordinate system and a second data point in the second coordinate system; and outputting the visual representation for display on a display device.

16. The system of claim 15, wherein the instructions further cause the at least one processor to normalize the data in the data set.

17. The system of claim 15, wherein determining the coordinate system comprises utilizing a two-dimensional coordinate system for at least one group in the data set.

18. The system of claim 15, wherein determining the coordinate system comprises utilizing a three-dimensional coordinate system for at least one group in the data set.

19. The system of claim 15, wherein determining the coordinate system comprises utilizing at least one two-dimensional coordinate system and at least one three-dimensional coordinate system for groups in the data set.

20. The system of claim 15, wherein the instructions further cause the at least one processor to enable rotation of the visual representation to enable viewing from different angles.

* * * * *